(12) United States Patent
Stoudt et al.

(10) Patent No.: US 8,528,811 B2
(45) Date of Patent: Sep. 10, 2013

(54) SYSTEMS AND METHODS FOR TARGETED POINT-OF-SALE ADVERTISEMENTS

(75) Inventors: Matthew John Stoudt, Santa Monica, CA (US); Nathan Fredric Gill, New York, CA (US); Sean Michael Lyden, Hermosa Beach, CA (US); Eric William Heatzig, Boca Raton, FL (US); Oliver Roger Koechli, Santa Monica, CA (US); Daniel R. Trotzer, Greenwich, CT (US)

(73) Assignee: Outcast Media, Inc., Santa Monica, CA (US)

( * ) Notice: Subject to any disclaimer, the term of this patent is extended or adjusted under 35 U.S.C. 154(b) by 191 days.

(21) Appl. No.: 13/031,015

(22) Filed: Feb. 18, 2011

(65) Prior Publication Data

US 2011/0226854 A1    Sep. 22, 2011

Related U.S. Application Data

(60) Provisional application No. 61/306,403, filed on Feb. 19, 2010.

(51) Int. Cl.
*G06K 5/00* (2006.01)
(52) U.S. Cl.
USPC ........................................ 235/380; 705/14.42
(58) Field of Classification Search
USPC ........................................ 235/380; 705/14.42
See application file for complete search history.

(56) References Cited

U.S. PATENT DOCUMENTS

| 6,450,407 | B1 | 9/2002 | Freeman et al. | |
|---|---|---|---|---|
| 6,869,013 | B2 | 3/2005 | Allen et al. | |
| 7,356,477 | B1 | 4/2008 | Allan et al. | |
| 2003/0065576 | A1 | 4/2003 | Harris | |
| 2004/0049425 | A1 | 3/2004 | Bakker et al. | |
| 2005/0127796 | A1 | 6/2005 | Olesen et al. | |
| 2006/0287925 | A1* | 12/2006 | Taylor et al. ................ | 705/26 |
| 2007/0132660 | A1 | 6/2007 | Nuttal | |
| 2008/0040219 | A1 | 2/2008 | Kim | |
| 2010/0145792 | A1* | 6/2010 | Worthen et al. ............ | 705/14.42 |
| 2010/0306069 | A1 | 12/2010 | Austin et al. | |
| 2011/0031311 | A1 | 2/2011 | Bakker | |
| 2011/0039616 | A1 | 2/2011 | Bakker | |
| 2012/0046976 | A1* | 2/2012 | Rourk ......................... | 705/4 |

FOREIGN PATENT DOCUMENTS

| WO | WO 93/16443 | 8/1993 |
|---|---|---|
| WO | WO 01/41033 | 6/2001 |

OTHER PUBLICATIONS

International Search Report for International Application No. PCT/US2011/025530 dated Apr. 27, 2011.

* cited by examiner

*Primary Examiner* — Allyson Trail
(74) *Attorney, Agent, or Firm* — Knobbe Martens Olson & Bear LLP

(57) ABSTRACT

Systems and methods of presenting targeted content to consumers at a point of sale using a customer profile derived at least in part from consumer credit or debit card information transmitted from the point of sale.

37 Claims, 6 Drawing Sheets

SYSTEMS AND METHODS FOR TARGETED POINT-OF-SALE ADVERTISEMENTS

CROSS-REFERENCE TO RELATED APPLICATIONS

This application claims the priority benefit under 35 U.S.C. §119(e) from provisional Application No. 61/306,403, filed Feb. 19, 2010 which is hereby incorporated by reference in its entirety.

BACKGROUND OF THE INVENTION

1. Field of the Invention

The present invention relates to the field of targeted point-of-sale advertising systems and methods.

2. Description of the Related Art

As consumers increase their use of electronic payment forms, point-of-sale systems featuring readers for these electronic payment forms enjoy increased presence in the marketplace. One enhancement of these systems has been the implementation of advertising and entertainment displays at or near the point of sale. For example, at many gas stations across the United States, a network of screens are now being operated at the gas pumps. Each gas pump has an audio/video player and screen. The screens play content, some of which may be advertisements, that begins early in the refueling process, for example, when the consumer lifts the gas pump handle. Examples of pump systems are described in U.S. Patent Publication 2005-0127796A1 entitled "Audio/Video Display Equipment for Gas Pumps," Which publication is hereby incorporated by reference in its entirety.

While the publication generally describes audio/video display equipment, improvements in this system are desirable.

SUMMARY OF THE INVENTION

The systems, methods, and devices of the disclosure each have several innovative aspects, no single one of which is solely responsible for the desirable attributes disclosed herein.

In one implementation, the invention comprises an advertising display system located proximate to a debit or credit card reader. The system may comprise a transaction data receiver configured to receive transaction data derived from customer use of a debit or credit card at the debit or credit card reader. A customer profile transmitter is provided and is configured to transmit customer profile information derived at least in part from the customer debit or credit card information. A player may be configured to receive transmitted customer profile information and to display content based at least in part on the transmitted customer profile.

One innovative aspect can be implemented in an advertising display system located proximate to a debit or credit card reader comprising means for receiving transaction data derived from customer use of a debit or credit at the debit or credit card reader. The system may comprise means for transmitting customer profile information derived at least in part from the customer debit or credit card information. Means for receiving transmitted customer profile information can display content based at least in part on the transmitted customer profile.

Another innovative aspect can include a computer readable, non-transitory medium storing instructions that when executed cause a computer system to receive transaction data derived from customer use of a debit or credit card at the debit or credit card reader, transmit customer profile information derived at least in part from the customer debit or credit card information, receive transmitted customer profile information, and display content based at least in part on the transmitted customer profile.

Another innovative aspect of the subject matter described in this disclosure can be implemented in a method of advertising in a display system located proximate to a debit or credit card reader. The method comprises receiving transaction data derived from customer use of a debit or credit card at the debit or credit card reader, transmitting customer profile information derived at least in part from the customer debit or credit card information, receiving transmitted customer profile information, and displaying content based at least in part on the transmitted customer profile.

Details of one or more implementations of the subject matter described in this specification are set forth in the accompanying drawings and the description below. Other features, aspects, and advantages will become apparent from the description, drawings, and claims. Note that the relative dimensions of the following figures may not be drawn to scale.

DETAILED DESCRIPTION

Figure 1A:
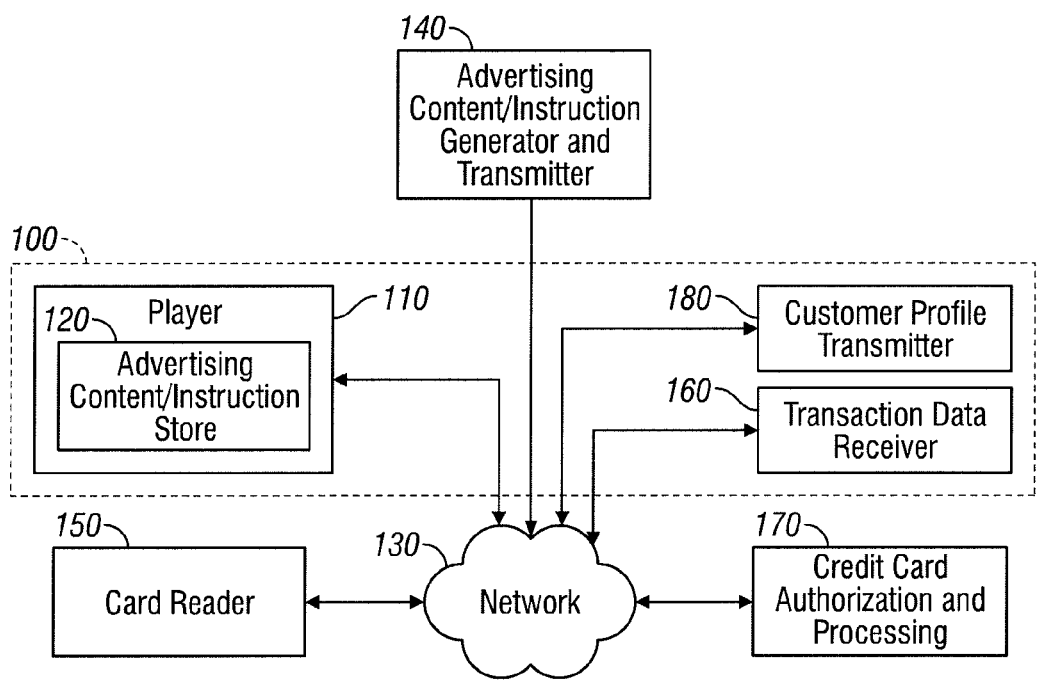
FIG. 1A a block diagram of an implementation of a targeted point-of-sale advertisement system according to the invention.

Automated point of sale systems can be impersonal transaction processing devices, even when they are coupled to advertising display systems as described above, as current systems provide a one-way path to display messages to customers. Each customer is essentially the same as the next. Each customer views the same message.

Because separate players at each point of sale can be triggered by the presence or activity of each consumer, the inventors have found it possible to create a content presentation that can be made different for different customers. With current installations of point of sale advertising display systems, no attempt has been made to determine or acquire information about individual purchasers at the point of sale location which would allow selective display of advertisements that are more likely to be of interest to the individual currently at the point of sale. However, because most purchases are authorized in advance using a credit or debit card (e.g., gas purchased at a pump), the inventors have realized that information about consumers paying by credit/debit cards can be obtained before the start of or during the content display. If a system were devised that utilized this information to produce a profile of the customer at or near the start of the transaction process (e.g., near the start of refueling), advertisements targeted to their demographic, purchase habits, etc., would be possible.

FIG. 1 a block diagram of an implementation of a targeted point-of-sale advertisement system according to an embodiment of the invention. The system 100 comprises a player 110, a transaction data receiver 160, and a customer profile transmitter 180.

According to the example implementation shown, the player 110 may be configured to receive transmitted customer profile information and to display content based at least in part on the transmitted customer profile as described further below. The player 110 may be coupled to a network and may comprise, for example, a visual presentation element, an audio presentation element, a processor, and an input means. The player 110 may comprise or be coupled to a storage means 120. The storage means 120 can store content. The storage means 120 can also store instructions for presenting content. According to the example shown, content and instructions can be generated and transmitted to the player from an advertising content/instruction generator and transmitter 140. Thus, via a network 130, the player 110 can receive advertising content and/or instructions. The advertising content and/or instructions can be stored in the storage means 120.

The system 100 may comprise one or more players 110. The system 100 may use a content management and distribution application (not shown) to create, schedule and traffic content to the player 110. Programming instructions and content can be scheduled as jobs within this application. Jobs can be disseminated to each player 110 in the system 100 in advance of their scheduled play periods via, for example, one or more of DSL, satellite and cellular technologies over network 130. One network implemented system to distribute multimedia jobs to players in a gas station environment is described in U.S. Patent Publication 2007/0132660 entitled System and Method for Media Distribution and Display, which is incorporated by reference herein in its entirety.

Each player 110 in the system 100 can store job instructions detailing what content elements are to play and the order in which they should play. Software on each player 110 can render and display content in based, at least in part, on instructions provided within the job. Jobs which comprise multiple content elements may be trafficked across the network instructing players 110 to insert specific content into the presentation based on the value or status of a variable which will be provided at a later date. In advantageous implementations, one or more of these variables is a customer profile that is produced and/or retrieved, and then sent to the player soon after the purchase transaction.

For example, a consumer card swipe at a card reader 150 can trigger the process of determining a customer profile, which is composed and delivered to the applicable player 110 in real-time or close to real-time. At the point the player 110 receives the customer profile, the job will reconcile the customer profile to the appropriate asset instructions and insert or select the appropriate content for the player 110 to display. If customer profile information is generated by a third party, it can be sent directly from the third party 170 (e.g., credit card issuer) to the player 110 or it can be routed via a different data center (e.g., the customer profile transmitter). The customer profiles may be stored in a database. The database can be polled by the networked players 110 when the customer starts the gas pumping process and the variables fetched accordingly. According to an example implementation, the system 100 matches transaction data with customer profile information so that content control variables are delivered to and processed by the appropriate player 110.

According to an implementation of the system 100, the content can be multimedia content. Images, sounds, and combinations of the two may be presented to the customer to provide a content experience tailored to the customer at the player 110. FIG. 1B is a front view of a gas pump display according to one implementation of the invention. As shown in this example, the player 110 can be integrated into the dispensing station which also may include a card reader 150. As the customer waits, the player presents the selected content tailored to the customer.

Once the player 110 receives the customer profile information, the customer profile information is processed according to one or more rules to determine which content to present to the customer. For example, if the customer profile information indicates the customer is a Visa card-holder, a rule in the player may select appropriate content for this customer (e.g., an advertisement promoting a discount for using a Visa card at a particular vendor). As described in greater detail below, data for generating a customer profile is first gathered from the credit or debit card transaction. This data is used to prepare the customer profile, and the customer profile is then sent to the player.

Figure 1B:
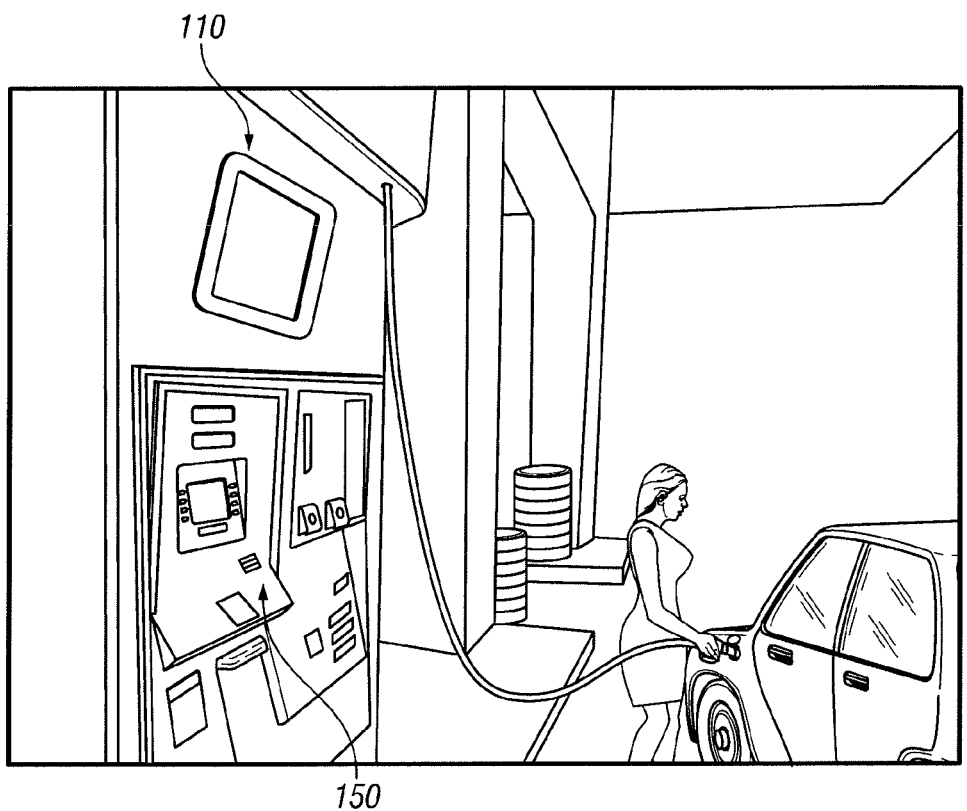
FIG. 1B is a front view of a gas pump display according to one implementation of the invention.

FIG. 1A shows a transaction data receiver 160 that may be utilized to perform some of these functions. The transaction data receiver 160 is configured to receive transaction data derived from a customer's use of a debit or credit card at a debit or credit card reader 150. Transaction data may comprise one or more of: a customer's credit or debit card information, a location the credit or debit card was used, or a time the debit or credit card was used. In an implementation of the system 100, the transaction data receiver 160 may be part of a credit card processing system. In other implementations, the transaction data receiver is a computer system separate from the credit or debit card processing system.

FIG. 1A also shows a customer profile transmitter 180. The customer profile transmitter 180 can be configured to transmit customer profile information derived at least in part from customer debit or credit card information which forms part of the transaction data. A customer profile is generally information about a particular customer. For example, customer profile information may comprise a general categorization of the customer's interests (e.g., sports enthusiast, food lover, pet owner). The customer profile information may comprise general information about the customer's finances (e.g., which bank issued their card, credit limit, level of activity with the card). The customer profile information may comprise general information regarding purchases (e.g., last visit to the current location, scheduled visits to the current location such as an oil change, preferred shopping days or times). In some implementations of the system, the customer profile may not be information about the customer as noted above, but may directly contain or refer to actual pre-selected content (e.g., a playlist) for the customer. The customer profile may also contain the content itself for the customer.

In general, the customer profile information is any data that a player utilizes to define any portion, order, or other aspect of content to display for the specific customer at the point-of-sale.

Figure 2:
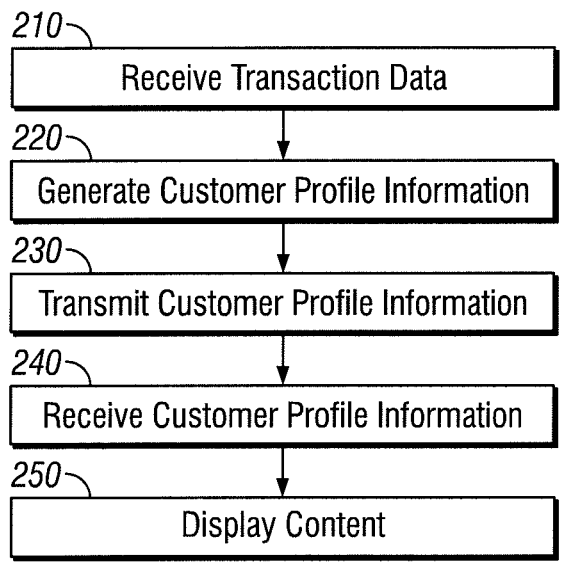
FIG. 2 is a flow diagram of an implementation of the method for targeted point-of-sale advertising according to the invention.

FIG. 2 is a flow diagram of an implementation of the method for targeted point-of-sale advertising according to one embodiment of the invention. At a block 210, transaction data is received. The transaction data can be received directly from a debit or credit card reader, or the transaction data can be received indirectly from a debit or credit card reader, through one or more intermediaries (e.g., transaction authorization server, anonymizer server, cryptographic server, pre-processing server). According to an example implementation, the transaction data is received via a network (e.g., satellite, LAN, WAN, cellular, peer-to-peer). The network may be a public network (e.g., the Internet), or a private network (e.g., VPN). This network may be the same network used for sending customer profile information. The information can be transmitted using appropriate and known network transmission protocols (e.g., TCP/IP).

In advantageous implementations of the system, the transaction data is received in real-time. Real-time is defined herein as the duration of a typical purchase period. For example, the transaction data can be received within seconds after the credit or debit card reader reads the card. While the transaction data may be received as individual transmissions of transaction data as the transaction occurs, the transaction data may be received in batch mode where each batch may contain data for one or more transactions.

The transaction data received is derived in part from the customer's use of a debit or credit card at a debit or credit card reader. In some cases, the customer's complete credit card information is not accessible. Even in this case however, information is derivable from the customer's debit or credit card. For example, the format of customer payment card number can comply with the ISO/IEC 7812 "Identification cards—Identification of issuers" specification wherein specific digits represent information about the identification card or the issuer. Typically, the first six digits of a credit card number are not secure, and are available for use by a transaction data receiver that is not part of a credit card authorization and processing system.

Another aspect of the transaction data may be that the transaction data is derived from the use of a specific debit or credit card reader. For example, the customer uses a card reader 150 at a particular gas pump, at a particular gas station. Accordingly, location information (e.g., one or more of pump, station, city, state, country) can be derived from the customer's use of a debit or credit card at the debit or credit card reader.

Another aspect of transaction data may be the time a customer uses the debit or credit card reader, as a timestamp is generally associated with a particular transaction in the card processing procedure. In one implementation, the timestamp may be the moment the card was swiped. In another implementation, the timestamp may be the moment the card authorization request was transmitted. In another implementation the timestamp may be the moment the card was authorized. In an implementation where the card is read using radio frequencies (e.g., RFID), the timestamp may be the moment the card signal was detected. It will be appreciated that one or more of the timestamps described herein may be used individually or in combination with other information to identify a particular customer, at a particular point of sale.

At a block 220, a customer profile is generated. According to one implementation, a customer profile transmitter generates customer profile information based at least in part on the received transaction data. In an example implementation, the customer profile transmitter first generates the customer profile at least in part by evaluating the first six digits of the debit or credit card. These digits identify of the card issuer (e.g., a specific bank or department store) and card type (e.g., Visa, America Express, Mastercard, Diner's Club). In this case, the "customer profile" may be the card issuer and/or card type.

At a block 230, the customer profile information is transmitted via a network (e.g., satellite, LAN, WAN, cellular, peer-to-peer). This network may be the same network used to receive the transaction data. In another implementation, the customer profile information is transmitted via a different network than the network used to receive the transaction data. The network may be a public network (e.g., the Internet), or a private network (e.g., VPN). The information is generally transmitted using appropriate and known network transmission protocols (e.g., TCP/IP). The information may also be processed prior to transmission for example, to optimize (e.g. compression) or secure (e.g., encryption) the transmission.

In some advantageous implementations, the transmission of the customer profile can be performed in response to a request from the player. In this implementation, the customer profile transmitter can wait for a request from the player to transmit the customer profile information. In another implementation, the transmission of the customer profile to the player may be automatic (e.g., once the profile is generated, once the profile is received, after a configurable amount of time). One customer profile for a transaction can be transmitted or multiple customer profiles for the same transaction can be transmitted. In this implementation, certain attributes for the customer profile may be quickly assembled. These attributes can be transmitted in a first customer profile. Subsequent customer profile information, either generated or received, can be transmitted in subsequent customer profiles.

At a block 240, the customer profile information is received. The customer profile information may be received directly or indirectly. The customer profile information may be received via a network (e.g., satellite, LAN, WAN, cellular, peer-to-peer). In another implementation, the customer profile information can be transmitted via a different network than the network used to receive the transaction data. The network may be a public network (e.g., the Internet), or a private network (e.g., VPN). The information can be generally transmitted using appropriate and known network transmission protocols (e.g., TCP/IP). The information may also be processed upon receipt for example, to optimize (e.g., compression) or secure (e.g., encryption) the transmission.

At a block 250, the received customer profile information may be used, at least in part, to display content. For example, rules can process the customer profile to determine the content to display to the identified customer. Rules can organize a sequence of content selected for display. In the case where multiple customer profiles are transmitted for the same transaction, the content selected and/or sequence of content may be revised as the content is played based on the transmitted customer profile information. Thus, a sequence of selected content, tailored for the customer, can be displayed to the customer.

Figure 3:
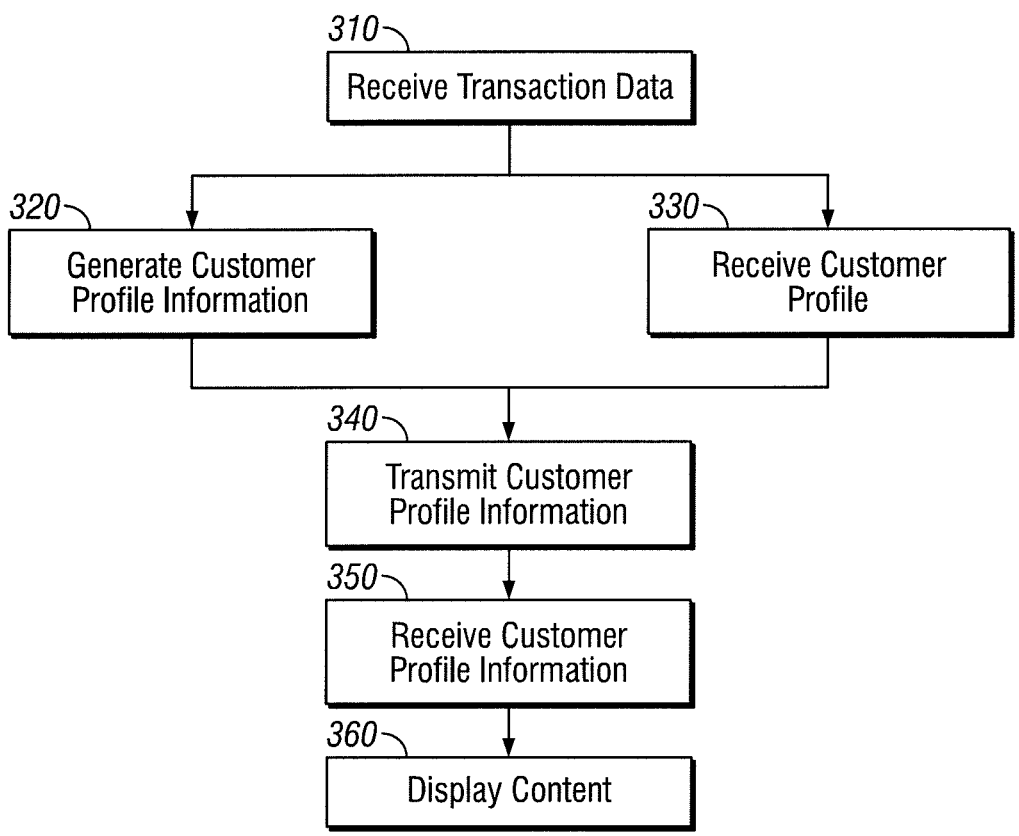
FIG. 3 is a flow diagram of a second implementation of the method for targeted point-of-sale advertising according to the invention.

FIG. 3 is a flow diagram of a second implementation of the method for targeted point-of-sale advertising according to the invention. The flow begins at a block 310 when transaction data is received. The transaction data is received, for example, as described above in FIG. 2.

According to this implementation, the transaction data may be used to generate a customer profile at a block 320. For example, generating a customer profile may comprise evaluating digits of the credit or debit card swiped at the credit or debit card reader.

The transaction data may be used at least in part to receive a customer profile at a block 330. In an example implementation, the customer profile transmitter issues a request via a network to, for example, a credit card issuing company. The request comprises information to identify a particular transaction. For example, the transmitter may provide a precise transaction timestamp and location that could be used by a credit card profile lookup server to sufficiently identify the particular cardholder. Using this information, additional information about the cardholder (e.g., affinities, purchases, credit limit, address) can be compiled by the profile lookup server, and transmitted in a customer profile in response to the request. The customer profiler transmitter can receive a customer profile as a response to the request.

According to an implementation, the system may be configured to perform one of blocks 320 and 330. According to an implementation, the transmitter may be configured to perform one or both of blocks 320 and 330. In this implementation, the method may be configured perform the blocks in parallel or in series. These blocks may also be repeated to refine the customer profile, for example, by collecting additional information or obtaining information not previously available.

At a block 340 the customer profile information is transmitted in a method similar to that described in FIG. 2. In an implementation, block 340 can be repeated to accommodate refining of the customer profile by blocks 320 and/or 330. Similar to FIG. 2, at a block 350 the customer profile information is received and at a block 360 content is displayed.

Figure 4A:
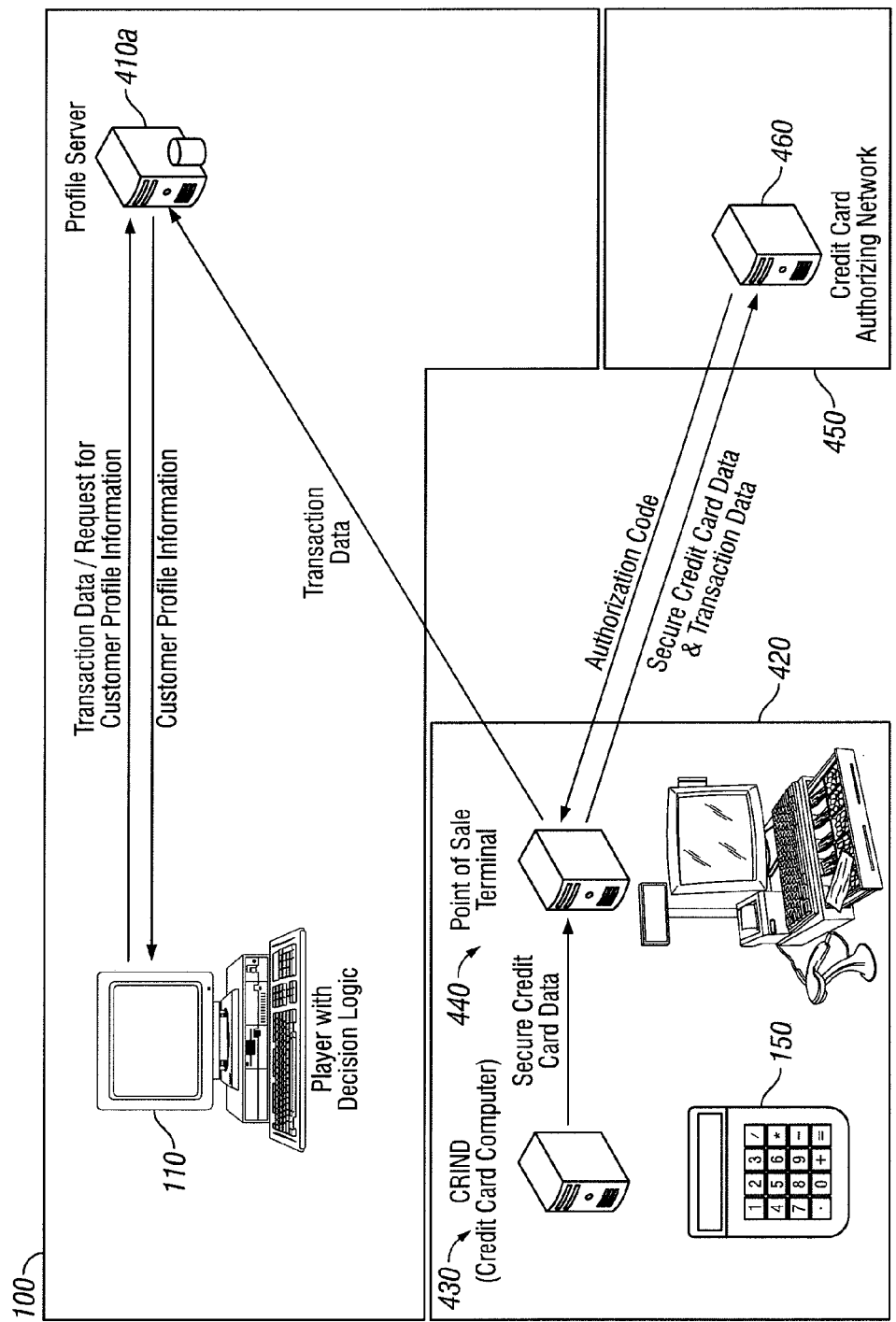
FIGS. 4A-4C are block diagrams of implementations of a targeted point-of-sale advertisement system according to the invention integrated at a point-of-sale location.
Figure 4B:
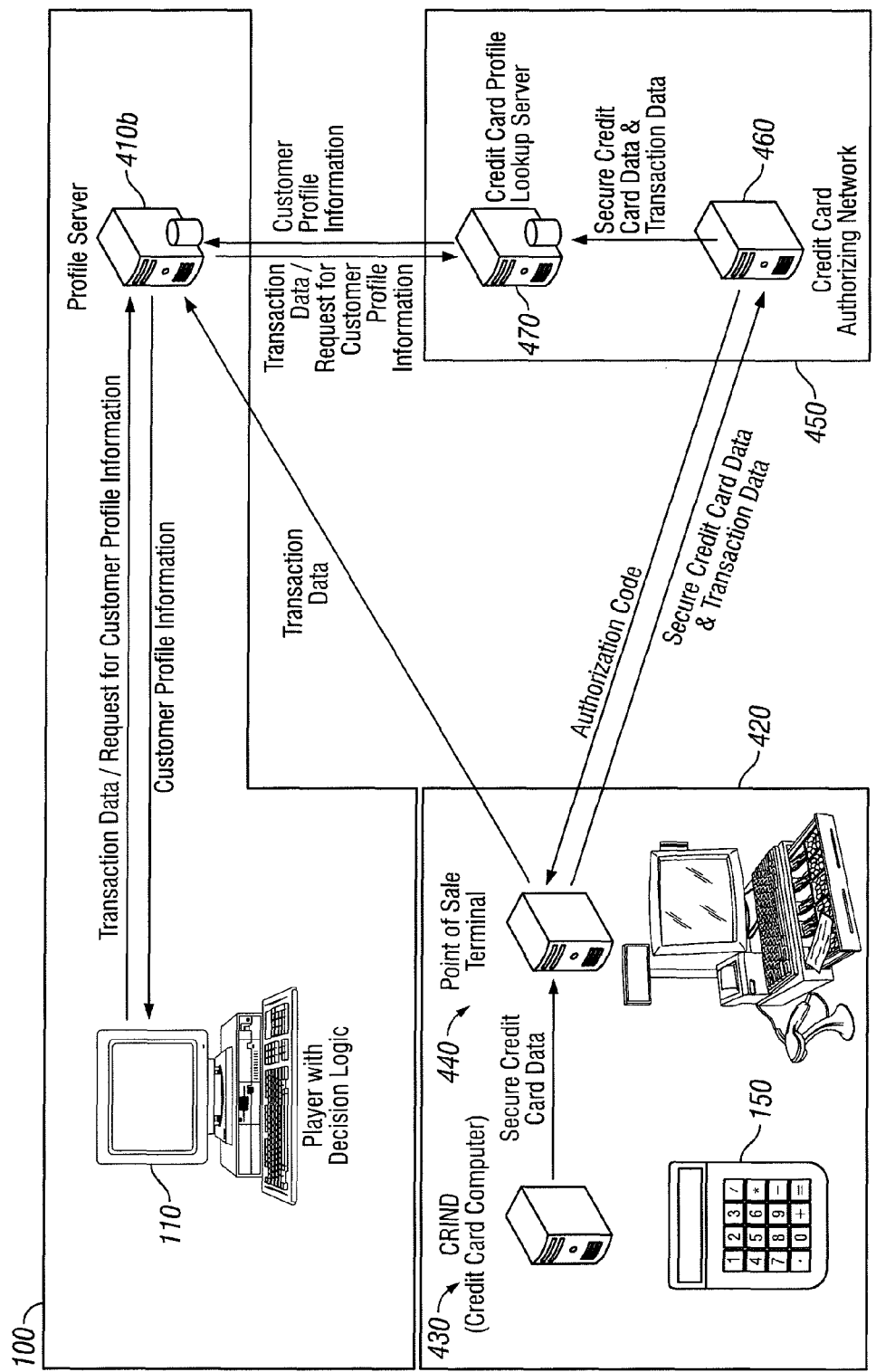
Figure 4C:
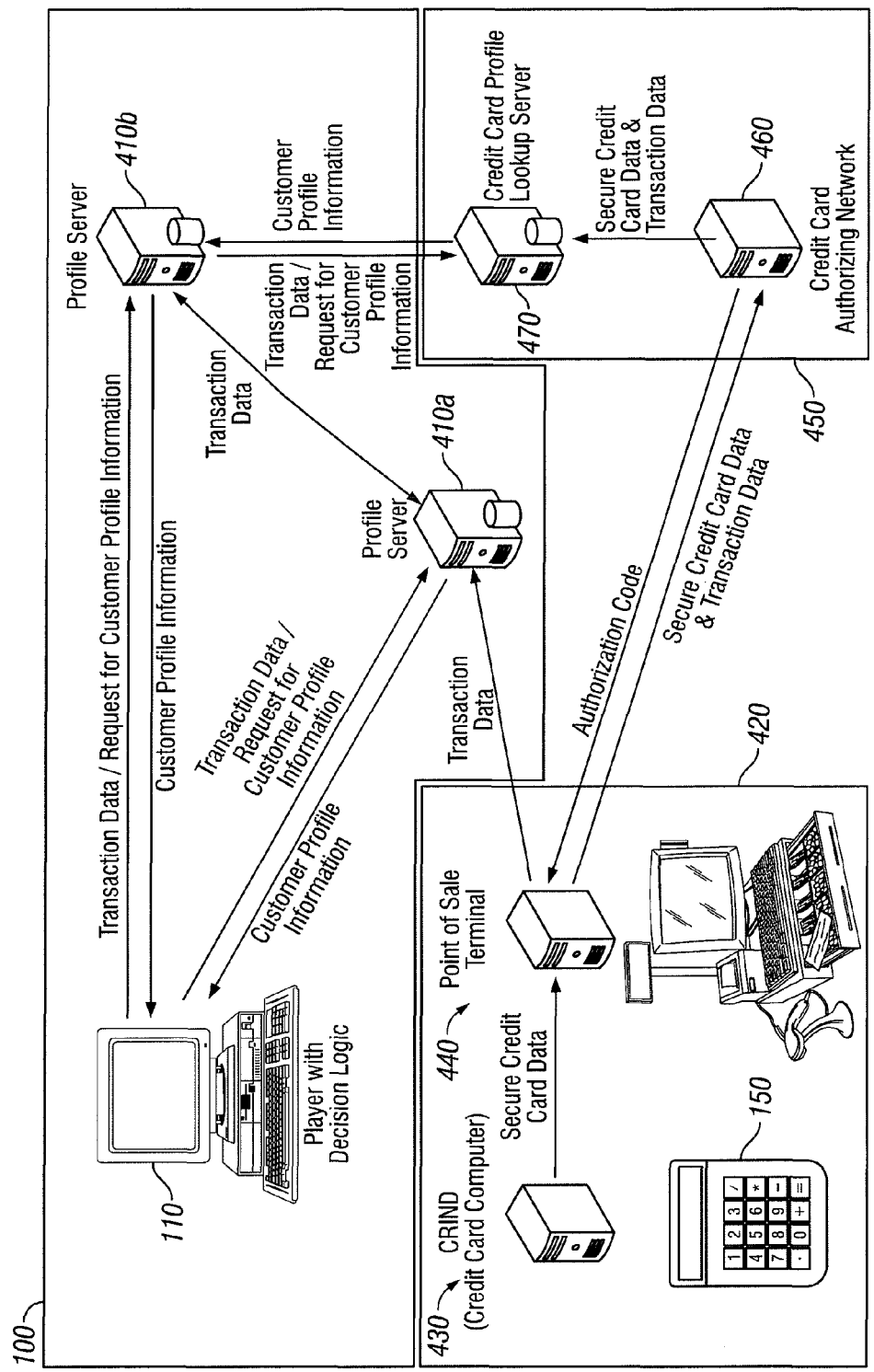

FIGS. 4A-4C are a block diagrams of implementations of a targeted point-of-sale advertisement system according to the invention integrated at a point-of-sale location.

According to this example, three main systems are shown: a targeted point-of-sale advertisement system 100, a merchant system 420, and a credit card payment processing system 450. The connections between the systems and components occur via network (e.g., satellite, LAN, WAN, cellular, peer-to-peer) which have been omitted to simplify the diagram.

The targeted point-of-sale advertisement system 100 is one possible implementation of the system shown in FIG. 1. The example system illustrated in FIG. 4A comprises a profile server 410a which may comprise a transaction data receiver and a customer profile transmitter. In this embodiment, the profile server 410a also generates the customer profile for transmission.

In the example shown in FIG. 4A, the merchant system comprises card reader 150. For example, the card reader 150 can be a card reader in dispenser (CRIND) 430 such a Gilbarco Q11489-06 Card Reader. In another implementation, the card reader 150 may read a card using radio frequencies (e.g., RFID). The card reader 150 may be integrated with the dispenser or coupled to the dispenser. The card reader 150 facilitates customer use of credit and debit cards for payment.

The credit or debit card information can be transmitted to a point of sale terminal 440. In an implementation at a gas station, this could be a terminal located in a convenience store at the station. The point-of-sale terminal 440 can generally be used for processing purchases. In the case where a customer uses a credit or debit card, the point-of-sale terminal 440, directly or indirectly through other intermediaries, transmits secure credit card data and transaction data derived from a customer's use of a debit or credit card at the debit or credit card reader 150 to a credit card issuer system 450. It will be understood that the point-of-sale terminal 440 in this example can refer to any hardware that is part of a point-of-sale system (e.g., terminal, site controller) to obtain information, for example, from the point-of-sale.

The transaction data transmitted to the credit card issuer system 450 can be used to generate an authorization code for the purchase. For example, an authorization server 460 can receive secure credit card data along with other transaction information to authorize the particular card for the transaction.

The point of sale terminal 440 may also transmit transaction data to the point-of-sale advertising system 100. The transaction data transmitted to the point-of-sale advertising system 100 can be processed as described above in reference to FIG. 1. In this embodiment, the entire credit card number, which is generally secure data available only to the credit card authorizing network 450, need not be sent to the profile server 410a. Instead, the transaction data may include just the first six digits of the credit or debit card that was used, which is publicly available information. In this embodiment, the profile server may be configured to act as a well known loyalty program server, which is often used to track card use for customer loyalty programs. The transaction data sent to the profile server 410a may also include other information as discussed above, such as a time stamp and/or location information. The profile server can then store the transaction data along with a customer profile that is generated from the first six digits of the card. In this case, the customer profile may be card issuer and type. When the user begins pumping gas, the player 110 may send some transaction data to the profile server, such as location and time information, and query the profile server database for matching transaction information. If a match is found, the customer profile (e.g. card issuer and type) is returned to the player 110, and the player can then configure its play of entertainment and advertisement according to stored rules regarding the received customer profile.

FIG. 4B shows an implementation where customer profile information is received by the point-of-sale advertising system 100 from a third party, in this example a credit card issuer system 450.

The targeted point-of-sale advertisement system 100 is similar to the system shown in FIG. 1. The example system illustrated in FIG. 4B comprises a profile server 410b which may comprise a transaction data receiver and a customer profile transmitter. In this example, the profile server 410b can request customer profiles from a credit card profile lookup server 470.

In this example, secure credit card information and transaction data can be sent to a credit card authorizing network 460 in the credit card issuer system 450. Transaction data can also be sent to a profile server 410b on the targeted point-of-sale advertisement system 100 as described above with respect to profile server 410a if FIG. 4A. The credit card authorizing network 460 can transmit secure credit card data and transaction data to a credit card profile lookup server 470. This information can be used by the credit card profile lookup server 470 to generate or retrieve a customer profile for the cardholder initiating this transaction. The customer profile can contain analytic data about the customer such as general affinities (e.g., affinities such as sports or pets, purchases, credit limit, address). Customer profiles associated with each holder of a card with a particular number are routinely created by the credit card companies.

The profile server 410b of the targeted point-of-sale advertisement system 100 can submit a request to the credit card profile server 470 to retrieve a customer profile. This request can contain transaction data that sufficiently permits the credit card profile lookup server 470 to identify the customer initiating the transaction with their corresponding customer profile. For example, given a particular transaction location and timestamp received by the credit card profile lookup server 470 from the profile server 410b, the credit card profile lookup server 470 could search for currently pending or recently completed authorization requests matching the transaction data. From this match, the identity of the specific cardholder at the card reader 150 can be found. The customer profile information for that cardholder can then be transmitted according to the methods described above to the profile server 410b. From the profile server 410b, the customer profile information for that cardholder can then be transmitted according to the methods described above to the player 110 proximate to the card reader 150 and used to select and present content to the customer.

As an alternative to the request based transmission of a customer profile from the credit card profile lookup server 470 to the profile server 410b, the credit card profile lookup server 470 could recognize transactions arising from specific locations, and serve the customer profile to the profile server 410b whenever it sees a transaction from one of these locations. In this case, the credit card profile lookup server 470 would push customer profiles to the customer profile server 410b without waiting for a request from the customer profile server 410b. The customer profile would generally be accompanied by some transaction data, so that when receiving such customer profiles, the customer profile server could then match the transaction data associated with the customer profile with transaction data it has identifying a particular player to then transmit the customer profile to.

FIG. 4C shows a combination of the systems described in FIGS. 4A and 4B. FIG. 4C shows implementation where the customer profile information can be generated and/or customer profile information can be received from a third party, in this example a credit card issuer system 450. While shown as two distinct profile servers 410a and 410b, it will be appreciated by one having skill in the art that the profile servers may be the same server. As discussed in reference to FIG. 3, customer profiles may be requested or generated in parallel or in series. The customer profiles may be obtained once or repeatedly allowing the system to refine the customer profile over time.

It will be appreciated that the above described system could be used in environments other than gas pumps, with especially advantageous application in any environment where credit card information is collected, and the purchaser has further time to view advertisements prior to transaction completion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web-site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc, or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the disclosure.

While the foregoing is directed to aspects of the present disclosure, other and further aspects of the disclosure may be devised without departing from the basic scope thereof.

What is claimed is:

1. An advertising display system located proximate to a debit or credit card reader, the system comprising:
a transaction data receiver configured to receive transaction data derived from customer use of a debit or credit card at the debit or credit card reader; the transaction data receiver configured to provide customer debit or credit card information associated with the transaction data to a customer profile transmitter and to a transaction authorization system;
the customer profile transmitter configured to transmit customer profile information derived at least in part from the customer debit or credit card information; and
a display configured to receive transmitted customer profile information and to display content based at least in part on the transmitted customer profile.

2. The system of claim 1, comprising a customer profile generator configured to generate customer profile information based at least in part on the received transaction data.

3. The system of claim 1, comprising a customer profile receiver configured to receive customer profile information associated at least in part with the received transaction data.

4. The system of claim 3, wherein the customer profile receiver is configured to request customer profile information using received transaction data.

5. The system of claim 1, wherein the customer profile transmitter transmits customer profile information in response to a request.

6. The system of claim 1, wherein the customer profile transmitter transmits customer profile information in real-time.

7. The system of claim 1, wherein the transaction data is a time stamp.

8. The system of claim 1, wherein the transaction data comprises location information.

9. The system of claim 1, wherein the transaction data comprises credit card information.

10. The system of claim 9, wherein the credit card information defines an entity issuing the credit card.

11. The system of claim 9, wherein the credit card information defines a credit card type.

12. The system of claim 1, wherein the transaction data comprises debit card information.

13. The system of claim 1, wherein the transaction data receiver is further configured to receive transaction data from a third source.

14. The system of claim 1, wherein the content is multimedia content.

15. The system of claim 1, wherein the transaction data receiver receives transaction data in real-time.

16. The system of claim 1, wherein the display is further configured to receive content.

17. The system of claim 1, wherein the display is further configured to receive content display rules.

18. An advertising display system located proximate to a debit or credit card reader, the system comprising:
means for receiving transaction data derived from customer use of a debit or credit at the debit or credit card reader and for providing customer debit or credit card information associated with the transaction data to means for transmitting customer profile information and to means for transaction authorization;
wherein the customer profile information is derived at least in part from the customer debit or credit card information; and
means for receiving transmitted customer profile information and for displaying content based at least in part on the transmitted customer profile.

19. The system of claim 18, comprising means for generating a customer profile based at least in part on the received transaction data.

20. The system of claim 18, comprising means for receiving customer profile information associated at least in part with the received transaction data.

21. A computer readable, non-transitory medium storing instructions that when executed, cause a computer system to:
receive transaction data derived from customer use of a debit or credit card at the debit or credit card reader;
transmit customer debit or credit card information associated with the transaction data to a transaction authorization system;
transmit customer profile information derived at least in part from the customer debit or credit card information;
receive the customer profile information; and
display content based at least in part on the customer profile.

22. A method of advertising in a display system located proximate to a debit or credit card reader, the method comprising:
receiving transaction data derived from customer use of a debit or credit card at the debit or credit card reader;
transmit customer debit or credit card information associated with the transaction data to a transaction authorization system;
transmitting customer profile information derived at least in part from the customer debit or credit card information;
receiving the customer profile information; and
displaying content based at least in part on the customer profile information.

23. The method of claim 22, comprising generating customer profile information based at least in part on the received transaction data.

24. The method of claim 22, comprising receiving customer profile information associated at least in part with the received transaction data.

25. The method of claim 24, wherein the customer profile information is received in response to a request for customer profile information derived from received transaction data.

26. The method of claim 22, wherein transmitting customer profile information is in response to a request.

27. The method of claim 22, wherein transmitting customer profile information is in real time.

28. The method of claim 22, wherein the transaction data comprises a time stamp.

29. The method of claim 22, wherein the transaction data comprises location information.

30. The method of claim 22, wherein the transaction data comprises credit card information.

31. The method of claim 30, wherein the credit card information defines an entity issuing the credit card.

32. The method of claim 30, wherein the credit card information defines a credit card type.

33. The method of claim 22, wherein the transaction data comprises debit card information.

34. The method of claim 22, wherein the content is multimedia content.

35. The method of claim 22, wherein transaction data is received in real-time.

36. The method of claim 22, comprising receiving content.

37. The method of claim 22, comprising receiving content display rules.

* * * * *